Patented Nov. 18, 1941

2,263,245

UNITED STATES PATENT OFFICE 2,263,245

CYANINE DYE

Edmund B. Middleton, Metuchen, and George A. Dawson, Stelton, N. J., assignors to Du Pont Film Manufacturing Corporation, New York, N. Y., a corporation of Delaware No Drawing. Application September 23, 1938, Serial No. 231,450

6 Claims. (Cl. 260—240)

This invention relates to new and improved dyes and more particularly to new and improved dyes which are especially useful as photographic sensitizers in films, plates and emulsions.

This application is a continuation-in-part of application Serial No. 30,928, filed July 11, 1935, which in turn is a continuation-in-part of our copending application Serial No. 601,290, filed March 25, 1932, now matured into United States Patent No. 2,079,376.

One object of the invention is to provide improved dyes having improved selective color sensitization in photographic emulsions. Another object is to provide new dyes to extend with relative uniformity the sensitivity of the emulsion to light in a wide range of wave lengths. A still further object is to provide dyes which extend with relative uniformity the sensitivity of the emulsion to light in the longer wave lengths, especially to those wave lengths in the vicinity of the red to green regions of the spectrum. Other objects will appear hereinafter.

These objects are accomplished by the preparation of certain novel types of cyanine dyes. These cyanine dyes are such as may be derived from bases having the following general formula (1)

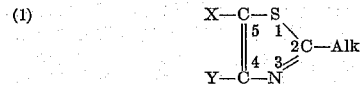

in which Alk represents alkyl, either X or Y or both represent monovalent substituents, one of which is alkyl.

In preparing these novel cyanine dyes from bases of the aforementioned type, we may obtain a variety of dyes by choosing bases with varying substituents in the X and Y positions of the foregoing general formula. Thus, one class of bases which we prefer to employ are the 2-methylthiazole bases having monovalent substituents replacing hydrogen in the 4- and/or 5-positions, at least one of said substituents being alkyl.

Dyes may be prepared from these bases in a number of ways. For example, we may convert the base to a quaternary compound by heating it with a suitable compound containing an organic radical and an acid residue, as, for instance, ethyl iodide or ethyl-para-toluene sulfonate. Such quaternary compounds may be given the general formula (2)

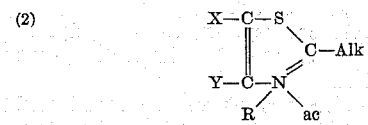

wherein Alk, X and Y have the same meaning as before, R represents alkyl and ac represents the residue of an acid.

By reacting these quaternary compounds with various intermediates, the desired dyes can be obtained. These dyes are all related and similar in that they are all cyanine dyes and all contain the nucleus represented by the radical (3)

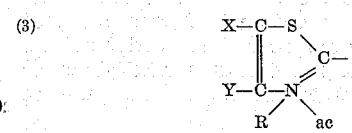

wherein X, Y, ac and R have the foregoing significance at least one of the symbols X and Y being alkyl. As will be clear from the formulas hereinafter given, this characteristic radical might also be represented as follows:

(3a)

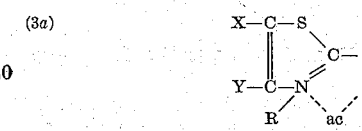

where ac represents the residue of an acid, and X, Y and R have the same significance as before.

One of the prefererd types of dyes is the pseudocyanines such as may be represented by the following general formula (4)

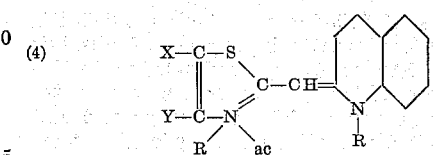

where one of the symbols X and Y represents alkyl, the other representing hydrogen, alkyl or aryl, R is alkyl and ac is the negative radical of an acid. These dyes might also be represented by the formula (4a)

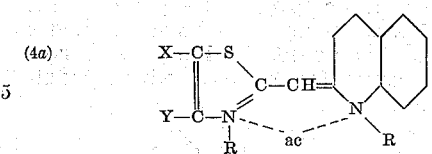

where X, Y, R and ac have the same significance as before.

The dyes related to the isocyanines form a second preferred class of dyes. These dyes may be given the following general formula (5)

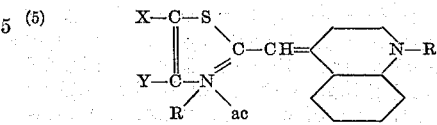

in which X, Y, R and ac have the same significance as before. These dyes might also be represented by the formula (5a) 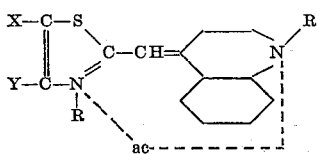

where X, Y, R and ac have the foregoing significance.

These preferred types of dyes may be represented generically by the formula (6) 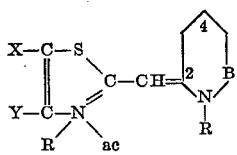

in which one of the symbols X and Y represents alkyl, the other representing hydrogen, alkyl or aryl, R represents alkyl, ac is the negative radical of an acid, and B represents a phenylene or naphthylene nucleus which may or may not be substituted.

An alternative generic formula is as follows:

(6a) 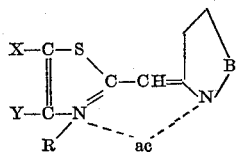

in which X, Y, B, R and ac have the foregoing significance.

The preparation of various dyes falling within the foregoing general formulae and the preparation of photographic emulsions from these dyes, together with a description of the sensitivity curves of said emulsions is illustrated by the following examples.

*Example I*

Two grams of 2:5-dimethyl-4-phenyl-thiazole ethiodide were dissolved in 120 cc. of absolute alcohol and 2.38 grams of alpha-iodoquinoline ethiodide were added. The mixture was heated to boiling under an upright condenser and 11.9 cc. of 6% alcoholic potassium hydroxide were dropped slowly down the condenser while the solution was boiled. After thirty minutes the boiling was discontinued. The solution was concentrated by evaporation and allowed to cool. Yellow-orange crystals formed, which were recrystallized from alcohol. The compound is a sensitizer for gelatino-silver halide photographic emulsions. For example, 10 to 50 mgs. of the dye in 50 cc. of alcohol, added to a liter of emulsion, extended the sensitivity to 580 $\mu\mu$ with a maximum at 540 $\mu\mu$.

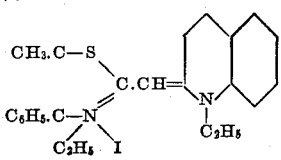

*Example II*

One and seventy-seven hundreths grams of 2:5-dimethyl-4-phenyl-thiazole ethiodide, 1.43 grams of quinoline ethiodide and 50 cc. of alcohol are heated to boiling in an open beaker. Nine and three-tenths cc. of a 6% solution of potassium hydroxide in alcohol are added drop by drop and the whole solution is boiled, while being stirred, for fifteen minutes after the alkali is added. It is then allowed to cool and water is added. An oil forms, which is separated and taken up in a small amount of butyl alcohol from which it is reprecipitated by addition of an excess of ether. It is then recrystallized from ethyl alcohol.

When a solution of 10 to 60 mgs. of the dye in 50 cc. of alcohol are added to a liter of emulsion, the sensitivity is extended to 580 $\mu\mu$ with a maximum at 540 $\mu\mu$.

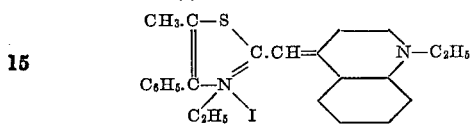

It will be apparent that by employing in the examples the molecularly equivalent proportions of other similar derivatives, the respective cyanines are formed. For instance, in Example I we may substitute for the 2:5-dimethyl-4-phenyl-thiazole ethiodide the molecularly equivalent proportions of the 2:4-dimethyl-thiazole ethiodide or 2:4:5-trimethyl-thiazole ethiodide to produce the respective cyanines in which the 4-position or the 4- and 5-positions contain a methyl substituent. Similarly, in the procedure of Example II we may produce dyes containing alkyl groups in both the 4- and 5-positions, or one hydrogen and one alkyl group in the 4- and 5-positions, by starting with other intermediates containing these substituents in said positions.

The intermediates in most cases may be prepared by well known general methods. One method of preparation involves the condensation of halogen substituted aldehydes, ketones, or halogen substituted ketonic esters with substituted amides. Among the compounds which have been prepared according to this general method may be mentioned those prepared by Hubacher, Annalen der Chemie, 259, 228–253; by Roubleff, Annalen der Chemie, 259, 253–276; by Hantzsch, Annalen der Chemie, 250, 257–273; by Osterreich, Berichte (1897) 30, 2254–2260; Schuftan, Berichte (1895) 28, 3070–3072; and Hofmann, Annalen der Chemie, 250, 314–320. Hubacher describes the preparation of various substituted thiazoles including alpha-methyl-mu-ethyl-thiazole (page 230), alpha-phenyl-mu-ethyl-thiazole (page 231), beta-mu-dimethyl-thiazole (page 240), and alpha:beta-diphenyl-mu-methyl-thiazole (page 240). Roubleff also describes the preparation of substituted thiazoles including alpha:beta:mu-trimethyl-thiazole (page 254), methyl-thiazyl-propionic ester (page 262), mu-methyl-alpha-ethyl thiazole (page 263), alpha:mu-dimethyl-thiazole-beta-carboxylic acid (page 265), mu-methyl-thiazole-alpha:beta-dicarboxylic acid (page 268), and mu-methyl-thiazole-beta-carboxylic acid (page 271). Hantzsch describes the preparation of substituted thiazoles including alpha:mu-dimethyl-thiazole (page 262), alpha:mu-dimethyl-thiazole-beta-carboxylic acid ester (page 269), and mu-methyl-alpha-phenyl-thiazole (page 269).

In the terminology used above, the mu-, alpha- and beta- positions correspond, respectively, to the 2-, 4- and 5- positions of the formulas given in this specification.

The various derivatives above described will react readily with alkyl halides such as the alkyl iodides, or with other well known types of compounds such as ethyl-para-toluene sulfonate, to produce the corresponding quaternary ammonium compounds. The acid radical represented in the foregoing formulas by "ac" may be another radical than an iodide or a para-toluene-sulfonate radical, as, for instance, a chloride, bromide or chlorate ($ClO_4$).

Any of the intermediates above described may be used in preparing the pseudocyanines according to the general methods given in the examples and, also, described by Hamer, J. C. S. 1928, 206-215. These intermediates may likewise be employed in preparing the dyes related to the isocyanines according to the methods given in the examples.

In the preparation of the pseudocyanines, molecularly equivalent proportions of other related quinoline derivatives such as alpha-iodenaphtho-quinoline ethiodide may be substituted for the alpha-iodo-quinoline ethiodide described in Example I, whereby cyanine dyes are produced in which one side of the dye formula contains a naphtho-quinoline nucleus. Naphthoquinoline alkyl salts and derivatives thereof may likewise be substituted for quinoline ethiodide in the preparation of the isocyanines as described in Example II to vary the righthand portion of the dye formula.

We have found that our invention has provided a type of novel cyanine dyes that has enabled us to obtain greatly improved color balance in the ultimate image, by the incorporation of one or more of our dyes in a photographic emulsion. These dyes act with marked efficiency to uniformly and selectively extend the sensitivity of prior panchromatic emulsions to light in a wide range of the longer wave lengths, especially in the vicinity of the red and green regions of the spectrum, without conferring any abrupt or over-emphasized increase of the sensitivity in any relatively restricted region of the spectrum that would tend to distort or destroy the desired color balance in the final photographic issue.

The term "aryl" is employed herein to cover phenyl, tolyl, xylyl, naphthyl and homologous radicals. The term "alkyl" is intended to cover methyl, ethyl, propyl, and higher homologues.

Having thus described the invention, what we claim as new and desire to secure by Letters Patent of the United States is:

1. A cyanine dye having the following general formula:

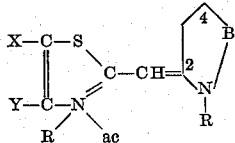

wherein one of the symbols X and Y represents alkyl, the other representing a radical selected from the group consisting of hydrogen, alkyl and aryl, R represents alkyl, ac represents the negative radical of an acid, B represents a nucleus selected from the group consisting of phenylene and naphthalene nuclei and the methine carbon atom is linked in one of the 2- and 4-positions.

2. A pseudocyanine salt having the following structure:

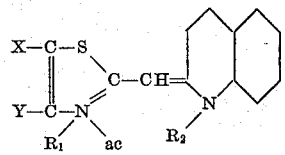

in which $R_1$ and $R_2$ represent alkyl groups, ac represents the negative radical of an acid, one of the symbols X and Y represents an alkyl group and the other represents a member selected from the group consisting of hydrogen, alkyl groups and aryl groups of the benzene series.

3. A dye having the following structure:

in which $R_1$ and $R_2$ represent alkyl groups, ac represents the negative radical of an acid, one of the symbols X and Y represents an alkyl group and the other represents a member selected from the group consisting of hydrogen, alkyl groups and alkyl groups of the benzene series.

4. A dye having the following structure:

5. A dye having the following structure:

6. The process of preparing pseudo cyanine dyes which comprises condensing, in the presence of a base, a 2-halogeno-quinolinium alkyl quaternary salt with a compound having the following formula in which R represents an alkyl group, ac an acid radical, one of the symbols X and Y represents an alkyl group and the other represents a member selected from the group consisting of hydrogen, alkyl groups and aryl groups of the benzene series.

EDMUND B. MIDDLETON.
GEORGE A. DAWSON.

CERTIFICATE OF CORRECTION.

Patent No. 2,263,245.  November 18, 1941.

EDMUND B. MIDDLETON, ET AL.

It is hereby certified that error appears in the printed specification of the above numbered patent requiring correction as follows: Page 3, second column, claim 5, in the last line of the formula, for "$C_6H_5$" read --$C_2H_5$--; and that the said Letters Patent should be read with this correction therein that the same may conform to the record of the case in the Patent Office.

Signed and sealed this 6th day of January, A. D. 1942.

Henry Van Arsdale,
Acting Commissioner of Patents.

(Seal)